United States Patent [19]

Wu

[11] Patent Number: 4,592,683
[45] Date of Patent: Jun. 3, 1986

[54] AUTOMATIC KEY CUTTING MACHINE

[76] Inventor: Kuo-shen Wu, No. 10, Alley 14, Lane 74, Pa Te Rd., Section 3, Taipei, Taiwan

[21] Appl. No.: 556,617

[22] Filed: Nov. 30, 1983

[51] Int. Cl.$^4$ .............................................. B23C 3/35
[52] U.S. Cl. .......................................... 409/83; 409/81
[58] Field of Search .............................. 409/81, 82, 83

[56] References Cited

U.S. PATENT DOCUMENTS

| 2,682,809 | 7/1954 | May | 409/81 |
|---|---|---|---|
| 3,196,750 | 7/1965 | Moessner et al. | 409/83 |
| 3,457,831 | 7/1969 | Adler et al. | 409/81 |
| 3,945,298 | 3/1976 | Cockroft | 409/83 |
| 4,023,464 | 5/1977 | Zion | 409/83 |

Primary Examiner—Gil Weidenfeld
Assistant Examiner—Glenn L. Webb
Attorney, Agent, or Firm—Birch, Stewart, Kolasch & Birch

[57] ABSTRACT

An automatic key cutting machine having a key carriage can be pivotably moved by means of a torsion spring, and can be moved leftward and rightward along a guide rod by means of a reversible motor as well as a pair of microswitches in order to effect the key cutting automatically. A snap lock is provided on the key carriage for enabling the latter to be locked in such a position that the key blank is moved away from the milling cutter for the convenience of releasing the key sample or securing the key blank on the key carriage.

5 Claims, 5 Drawing Figures

4,592,683

AUTOMATIC KEY CUTTING MACHINE

BACKGROUND OF THE INVENTION

1. Field of the Invention

The present invention relates to a key cutting machine, and more particularly to an improved automatic key cutting machine having a key carriage that can be pivotably moved by means of a torsion spring, and can be moved leftward and rightward along a guide rod by means of a reversible motor as well as a pair of microswitches in order to effect the key cutting automatically.

2. Description of Background Art

In a conventional automatic key cutting machine, the milling cutter and key carriage are driven by the same motor, hence cams should be used for obtaining reciprocal movement of the key carriage. However, the use of cams can only urge the key carriage to move forward for effecting the key cutting, and can not urge the same to return to its original position. For effecting the next key cutting, it is necessary to have the key carriage pivotably moved by hand to such a degree that the key blank is moved away from the milling cutter and thus the key arriage can be moved back to its original position. This will decrease the cutting speed and its accuracy. Furthermore, it is impossible for the key carriage to change its moving direction and to make a stop during its moving period due to the use of cams.

SUMMARY AND OBJECTS OF THE INVENTION

An object of the present invention is to provide an improved automatic key cutting machine comprising two motors, in which one of the motors is used for driving a milling cutter to rotate while the other motor is a reversible motor and used for driving a key carriage which is moved leftward and rightward in conjunction with a pair of microswitches. The key carriage can make a stop during its moving period by means of a double pole, single throw switch.

According to the present invention there is provided an automatic key cutting machine comprising a motor arranged in conjunction with a toggle switch for driving a milling cutter to rotate. A torsion spring is arranged between a guide rod and a key carriage for biasing a key sample secured on the key carriage against a guide secured on a frame, and biasing a key blank secured on the key carriage against the milling cutter for cutting the key blank. In addition, the following members are provided, a lead screw slidably engaged with the guide rod; a reversible motor for driving the key carriage to move leftward and rightward; a small lead screw; a nut engaged with the small lead screw and having a protrusion protruding between a pair of microswitches for butting against the latter in order to enable the key carriage to make a stop when cutting of the key blank is completed; and a snap lock for locking the key carriage in such a position that the key blank is moved away from the milling cutter for the convenience of releasing the key sample or securing a key blank on the key carriage.

BRIEF DESCRIPTION OF THE DRAWINGS

An embodiment of the present invention will now be described by way of example with reference to the accompanying drawings in which.

DETAILED DESCRIPTION OF THE PREFERRED EMBODIMENT

Figure 1:
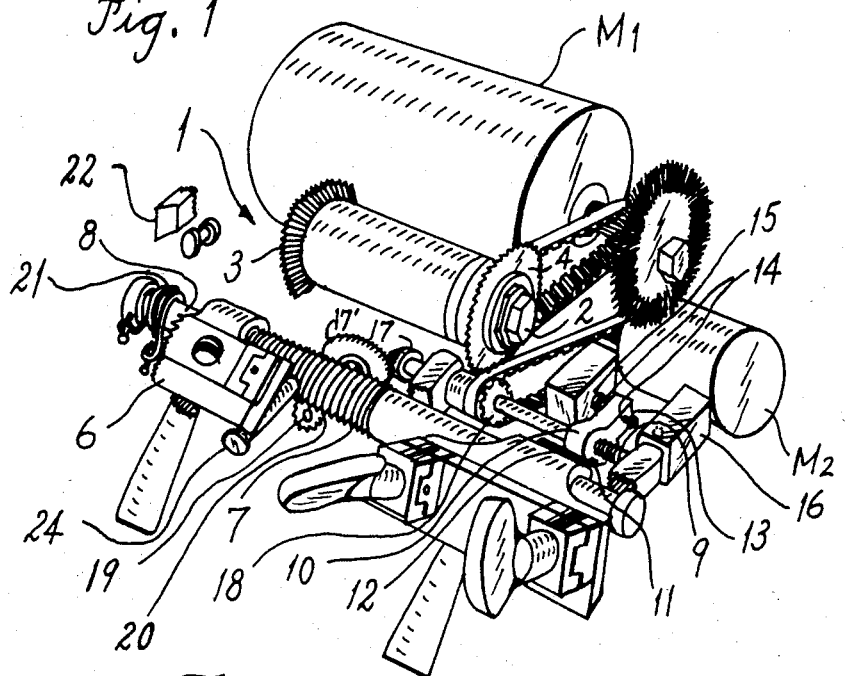
FIG. 1 is a pictorial view of an embodiment of an automatic key cutting machine in accordance with the present invention.
Figure 2:
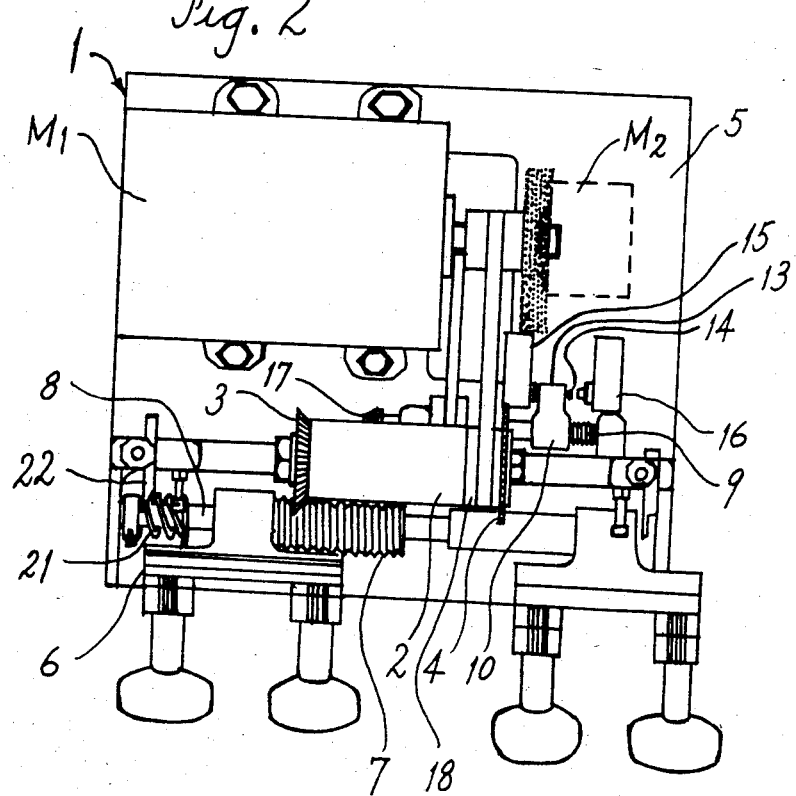
FIG. 2 is a top view of the automatic key cutting machine of FIG. 1.

Referring now to FIGS. 1 to 4, the automatic key cutting machine of this invention includes a motor $M_1$ secured on a base 5 for driving a pair of milling cutters 3 and 4 secured on an axis 2 rotatably secured on the base 5. A reversible motor $M_2$ is also secured on the base 5 for driving a key carriage 6 to move leftward and rightward. A nut 10 is engaged with a small leader 9 rotatably secured on the base 5, and having a protrusion protruding between a pair of microswitches 15 and 16 for butting against the latter in order to cut off a circuit of the reversible motor $M_2$, and urge the key carriage 6 to be stopped. The protrusion is also provided with a pair of regulating screws 14 at left and right sides thereof for serving as a punch rod for respectively butting against microswitches 15 and 16. The nut 10 is further provided with an elongated slot 11 for engagement with a rail 12 secured on the base in order to urge nut 10 to move leftward or rightward along rail 12 when small lead screw 9 rotates in a clockwise or counter-clockwise direction.

The small lead screw 9 is driven by the reversible motor $M_2$ by means of a belt gear 18 as well as a belt 5. A bevel gear 17 is secured at one end of the small lead screw 9, and meshed with a bevel gear 17' secured on an axis 19 in order that the latter can be driven by the reversible motor $M_2$. A worm gear 20 is secured on the axis 19, and meshed with a lead screw 7 for driving the latter leftward or rightward. The leader 7 is in a form of a worm, and slidably engaged with a guide rod 8. A key carriage 6 is secured on the lead screw 7 in order that the former can be moved together with the latter. A torsion spring 21 is arranged between the guide rod 8 and key carriage 6 for biasing a key sample (not shown) secured on the left end side of the key carriage 6 against a guide 22 secured on the base 5, and for biasing a key blank 23 secured on the right end key carriage 6 against the milling cutter 3 in order to urge the milling cutter to cut the key blank 23 for duplicating a key to be the same as the key sample (not shown) when the key carriage 6 is moved leftward and the key sample is moved along the guide 22.

Figure 3:
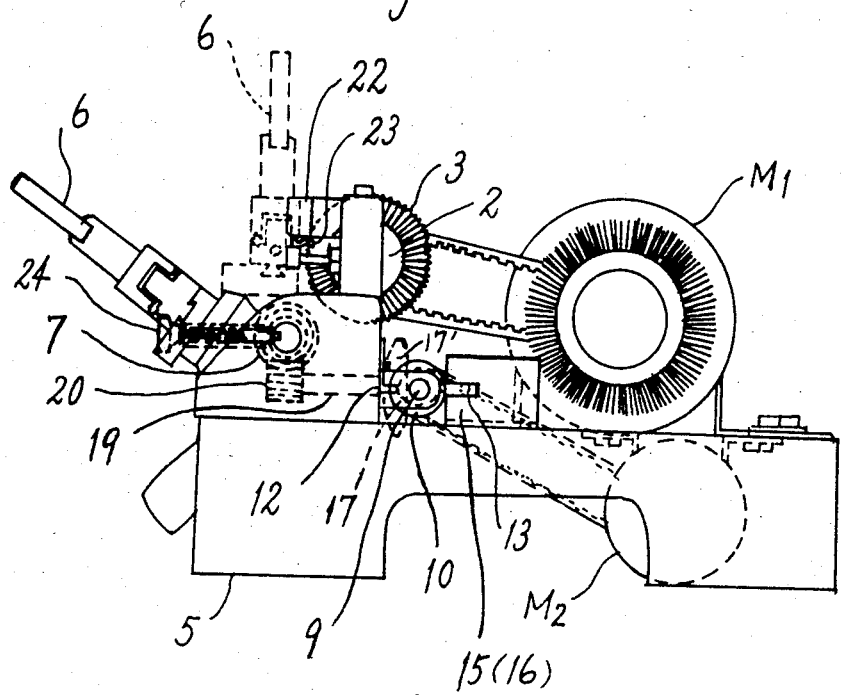
FIG. 3 is a side view of the automatic key cutting machine of FIG. 1.
Figure 4:
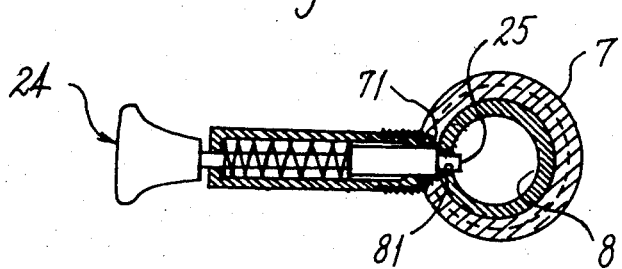
FIG. 4 is a sectional view of a snap lock in accordance with the present invention.

Referring now to FIGS. 3 and 4, the leader 7 and guide rod 8 are respectively provided with an elongated slot (71, 81) arranged in alignment one with the other for receiving a snap lock 24 in order to enable the key carriage 6 to be angularly moved and locked in a position away from the cutter and guide for the convenience of releasing or securing the key sample and a key blank on the key carriage.

Figure 5:
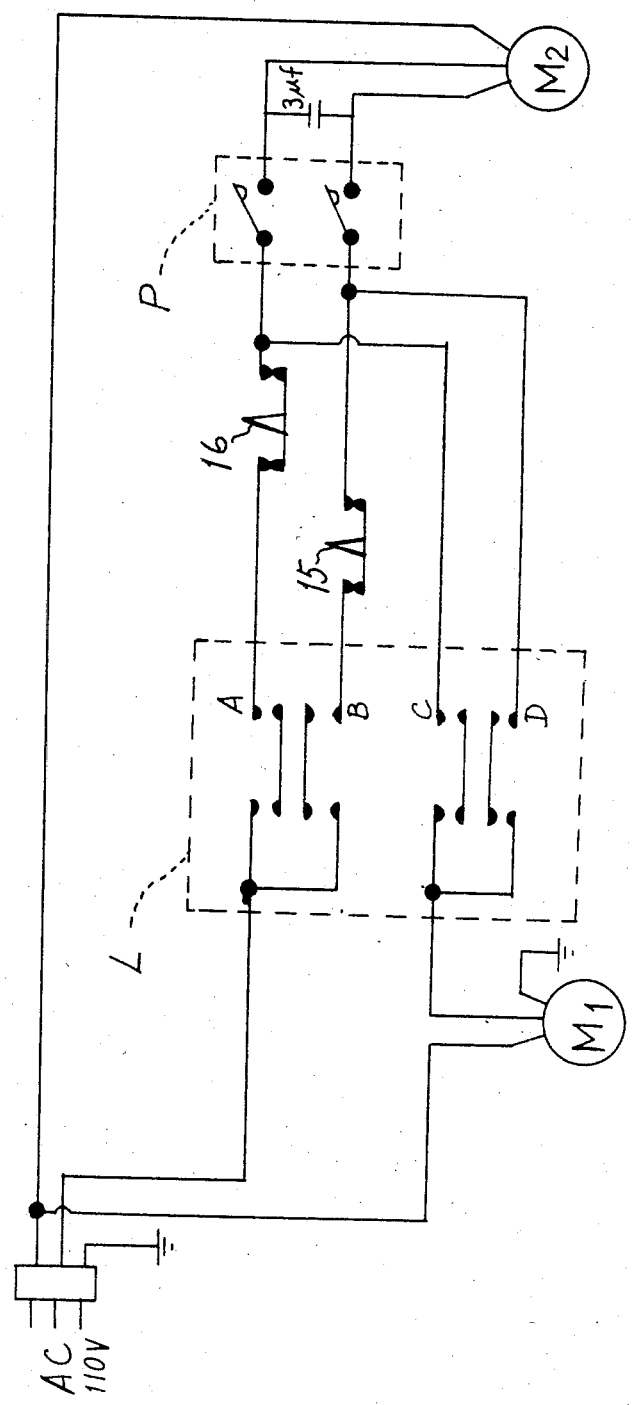
FIG. 5 shows one possible embodiment of the circuit of the present invention.

Now please turn to FIG. 5, when the toggle switch L is in its left side "ON" position, the movable plate will be moved to contacts B and D to form a circuit including motor $M_1$ for driving the milling cutters 3 and 4 to rotate, and a circuit including the reversible motor $M_2$ for driving key carriage 6 to move leftward for cutting a key blank, and driving nut 11 to move leftward. The circuit including the reversible motor $M_2$ will be broken, and motors $M_1$ and $M_2$ will be stopped when the regulating screw 14 butted against microswitch 15. On the contrary, when the toggle switch L is in its right side "ON" position, the movable plate will be moved to contacts A and C to form a circuit including $M_1$ for driving the milling cutters 3 and 4 to rotate, and a circuit including reversible motor $M_2$ for driving key carriage 6 to move rightward for cutting key blank, and driving nut 11 to move rightward. The circuit including the reversible motor $M_2$ will be broken, and motors $M_1$ and $M_2$ will be stopped when the regulating screw 14 abuts against the microswitch 16. Obviously, the key carriage can be moved leftward and rightward without moving the same away from milling cutter.

The above said circuits may include a double pole, single throw switch P for urging reversible motor $M_2$ to be stopped when switch P is opened, and motor $M_1$ keeps rotating.

I claim:

1. An automatic key cutting machine comprising:
   a motor for rotably driving a milling cutter;
   a key carriage for holding a key sample to be copied and a key blank to be machined into the form of the sample by the milling cutter;
   a guide structure along which the key carriage is linearly movable;
   bias means for biasing the key carriage into a working position in which a key sample carried thereby is engaged by a guide secured on a frame of the machine, and in which a key blank carried by the carriage is engaged by said milling cutter;
   a reversible rotary motor;
   rotary-to-linear motion conversion means arranged to convert rotation of an output shaft of the reversible motor into linear movement, said conversion means including an output member linearly slidable along said guide structure and mounting the key carriage, the guide structure being in the form of a guide rod extending through an aperture in said output member and the key carriage being pivotal about the axis of the guide rod into its working position under the action of said bias means, said output member is lead screw serving as a rack gear, the lead screw being engaged by a pinion of the conversion means and having an axial aperture through which said guide rod passes, the key carriage being coupled to said conversion means such that operation of the reversible motor causes the key carriage to move along the guide structure in a direction dependent on the sense of rotation of said output shaft; and
   a limit arrangement means for automatically deenergizing said reversible motor to stop the key carriage when the cutting of a key blank is complete, said limit arrangement means including a pair of spaced switches connected into the energization circuit of the reversible motor and a switch-operating member linearly reciprocable movable by said conversion means between said switches whereby to operate the latter at respective predetermined limit positions of the carriage along its guide structure.

2. A key cutting machine according to claim 1, wherein said rotary-to-linear motion conversion means comprise respective rotary-to-linear action conversion members for driving the key carriage and for driving the switch-operating member.

3. A key cutting machine according to claim 1, wherein said rotary-to-linear motion conversin means comprise a common rotary-to-linear motion conversion member for driving both the key carriage and the switch-operating member.

4. A key cutting machine according to claim 1, wherein said output member is a lead screw serving as a rack gear, the lead screw being engaged by a pinion of the conversion means and having an axial aperture through which said guide rod passes.

5. A key cutting machine according to claim 1, wherein the switch-operating member is provided with a pair of adjustable screws on opposite sides thereof for engaging respective ones of the said switches.

* * * * *